6614X
PATENTED JULY 20, 1831.
E. BATES & D. UPDEGRAFF.
COOKING STOVE.
2 SHEETS—SHEET 1.
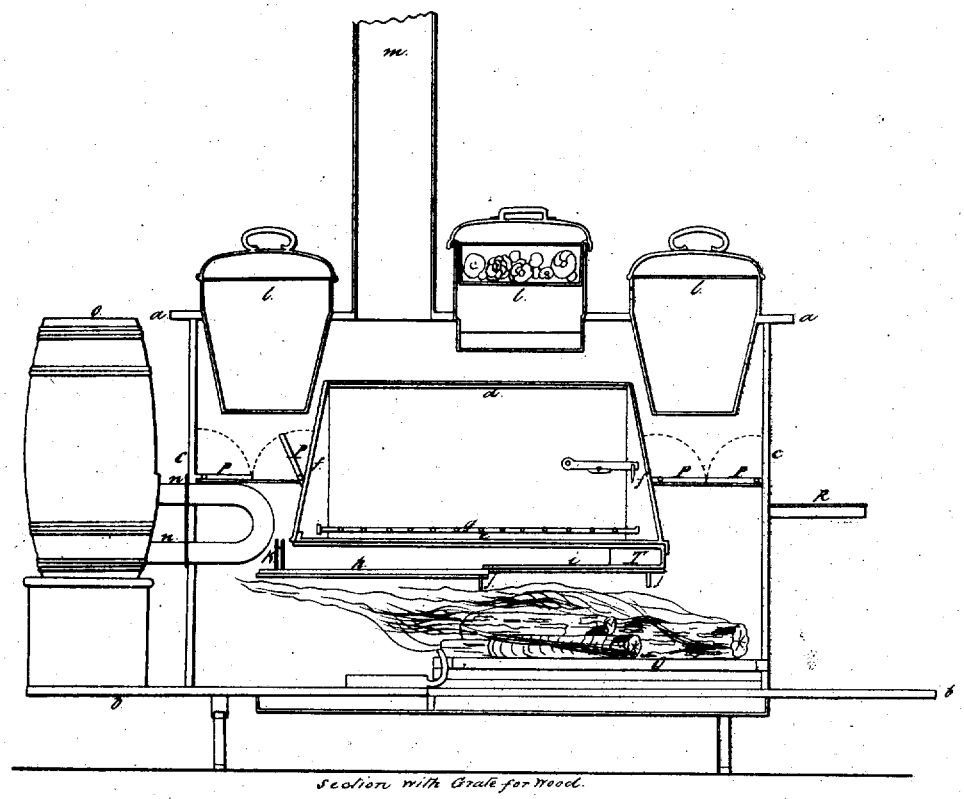
Section with Grate for Wood.
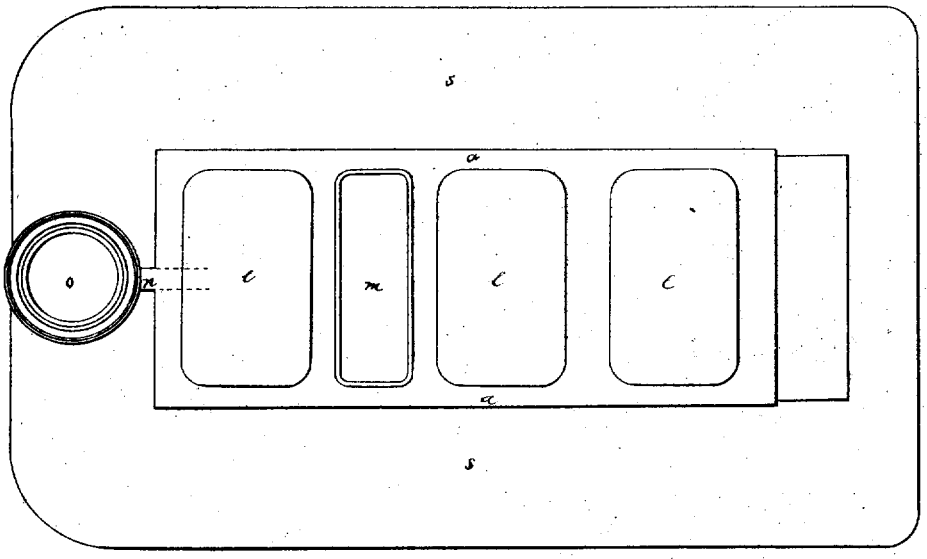
Plan.

6614X
PATENTED JULY 20, 1831.
E. BATES & D. UPDEGRAFF.
COOKING STOVE.
2 SHEETS—SHEET 2.
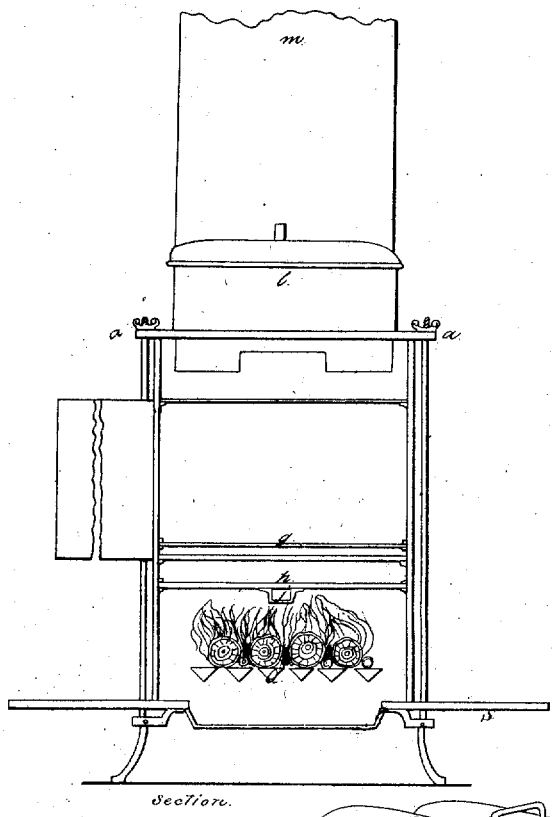
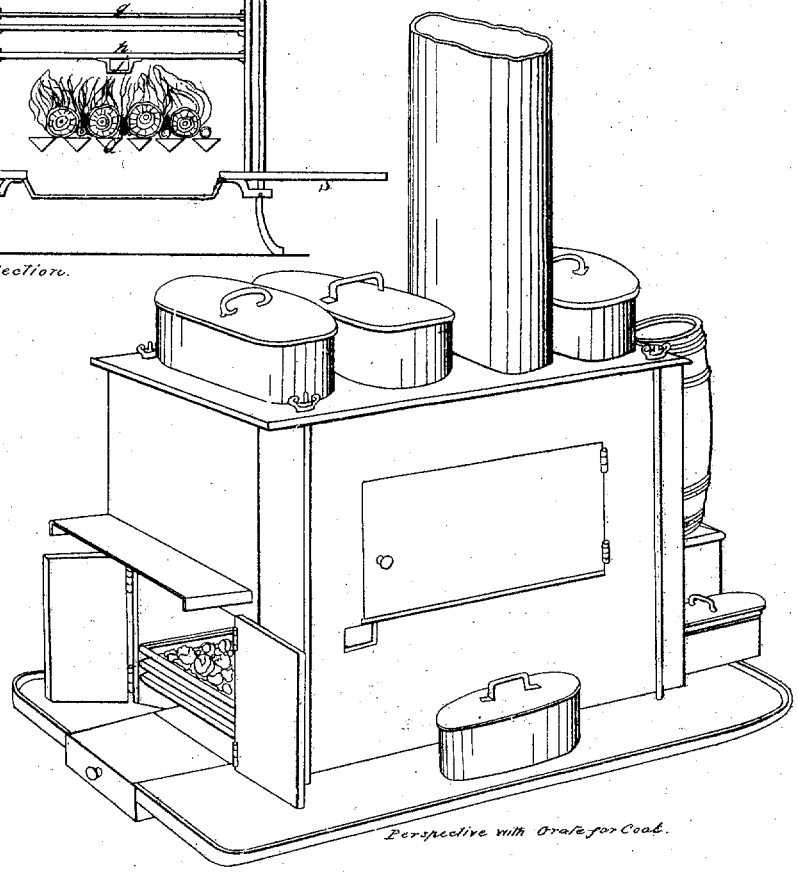

Elisha Bates & David Updegraff. Jefferson Ohio.

6614X

Letters Patent

The schedule referred to in these Letters Patent and making part of the same, containing a description in the words of the said Elisha Bates and David Updegraff themselves of their improvement in the cooking Stove —

To all to whom these presents shall come;

Be it known that we Elisha Bates and David Updegraff of Jefferson County and State of Ohio have invented a new and useful improvement in a cooking Stove and the following is an exact and full description of the said Stove as invented or improved by us.

A Stove containing within the body of it a fire place and above it an oven with flues around it at the bottom, top and two ends [illegible] boilers and a tea kettle with divided bottoms to be inserted through openings in the top into the top flue with or without cases, a boiler to be placed at the back end, with circulating tubes to be introduced through the back end into the back flue opposite and above the lower back corner of the oven; dampers to close when desired the oven flues [illegible] sliding plate to close or throw it open and a ventilator to carry off the heated air [illegible] when closed; a sliding grate for wood or coal, with an ash pit to receive the ashes and an ash box to remove it; [illegible] fastened on the principle of the lever, with [illegible] inserted with staples and the lever or [illegible] [illegible] kept in its place by the side rods of the Stove; shelves or the bottom extending along the sides to support the small side boilers [illegible] intended to be heated or kept warm. Covers for the openings in the top of the Stove, some [illegible] to receive the bottoms of cooking pots or kettles and others with edges raised sufficient for baking, frying and [illegible]; a [illegible] plate over the fire doors to complete an open fire place when the doors are open and the grate drawn forward, and [illegible] to be suspended at convenient heights in the [illegible].

[illegible] may be either single

6614X in its sides and ends or smaller as may be preferred — put together in the manner of a common ten plate stove and secured with four rods [illegible] one on each side three inches from the corners and passing thro' projections on the top and bottom plates & on the sides of the feet. For a large family it may be three feet long two feet high and sixteen inches wide in the clear. The fire place opens with two doors in the front and eleven inches high and twelve and a half wide it extends the length and width of the stove, and is Eight inches high.

The oven is placed at about an equal distance from each end about 24 inches long and 10 high exclusive of the thickness of the plates. The bottom plate rests on ledges on the sides about a [illegible] inch each way only thinner at the out edge At the top it may be 4 inches shorter The end plates may be six inches high resting on the ends of the bottom plate in which are ledges running across to keep the end plates out. They are further supported on the outside by ledges on the side plates. The top plate of the oven may be made of sheet iron supported on ledges at the sides and bending down to meet the end plates and pass inside of them about an inch. The doors of the oven are thro' the side plates and are even with the bottom, — and may also in size and form correspond with the inside of the oven in which case if the top of the oven be shorter than the bottom the doors or [illegible] may extend over the contracted corners or the openings in the oven may be made a little lower than the oven and as long as the oven at top. A little bead on the outside of the side plates will form convenient rabbits for the doors to shut in. The hinges may be of any convenient kind and the latches be inside of the doors the wires on which they are fixed and turn passing through and receiving handles made of wire bent into spiral coils the top end of the wire doubled and bent down at right angles with the stem and the two ends wrapped closely round the pin of the latch made square for the purpose and having a screw or key to keep it on.

It may be furnished with dripping pans to be made of sheet iron or other suitable materials, and have a tight grate of wire of some [illegible] as wide as the door, and including the thickness of the plates

[illegible] an inch longer than the doors. In the edges of which may be notched 1/4
of an inch deep, to support it at convenient heights, & in each edge of each
[illegible] about an inch apart [illegible]. These should be longer in the edge
of the doors than the thickness of the grate, to admit the knobs on the under
side of the end 1/4 inch from each corner to pass through to prevent the
grate from slipping out of the notches, or if the door should be as large
as the inside of the oven small projections on the edge of the doors will
answer. The flue at the bottom of the oven is formed by bottom plate of the
oven, and two sliding plates separating it from the back flue except the
ventilator hereafter to be described. The bottom sliding plate rests in a rabbet
in a ledge on each side plate, extending from a little back of the back
corner of the oven to the front plate. The ledges are half an inch thick and
[illegible] wide. The rabbet is a [illegible] of an inch. This back sliding plate reaches forward
to the middle of the oven. The front sliding plate laps half an inch on
the front end of this and rests on the upper surface of the ledge and extends
to the front corner of the oven — to which one upright turn of the plate
reaches. The bottom plate of the oven has a ledge on its under surface
at the front end 3/8 of an inch at its greatest thickness and one inch
wide to which the upright turn of the front sliding plate reaches.
Each sliding plate has on its under side, and near its front edge
a staple by which to push it backward or forward, with a poker with a
crooked end. At the back end of this flue is a plate running across the
stove and resting with its lower edge in notches in the ledges of the sli-
-ding plates so as to close with the back sliding plate, and extending
perpendicularly half an inch back of the oven and two inches above its
lower corner. It is kept from moving forward by the ledges at the back
of the oven, and the notches in those of the lower flue, and from going back
by upright ledges on the side plates reaching up as high as the depth
of this flue. The end flues are formed by the ends of the stove and the
[illegible] of the oven. The top flue is between the top of the oven and the top of the
stove. The [illegible] for the top of the stove are formed like [illegible]
[illegible] height, the longest diameter [illegible] the stove.
[illegible] projections to [illegible] the [illegible]

6614X

The division or divisions in these bottoms are for the passage of the fire.
The tea kettle may be made of any desired form but large enough in the
body to cover the opening designed for it in the top of the Stove The bottom
designed to pass into the flue, should be formed in the same manner as the
bottoms of the boilers Those designed for the end flues may be six inches deep
tapering to suit the size of the boilers and rounded at the corners The boilers
intended for the middle opening on the top of the Stove should not descend
into the flue more than two inches deep. This should be divided in the bottom
as the others The openings in top of the Stove for boilers &c. three in number
are 14 inches long in the direction across the Stove, and eight inches wide
the corners rounded as may be desired The two at the back end may be
3½ inches apart The opening for the Stove pipe is 14 inches across the Stove and
5½ wide Between it and the openings on each side is a space of 1½ inch
The tube at the back end of the Stove may be made of wood, or any other
suitable material In the former case, the side next the Stove may be
faced with tin. It may be in the form of a Keg of convenient dimensions
and when attached to the Stove stand in a bench of convenient height.
To this are [illegible] two tubes of about 1¼ inch in diameter made of Copper
or other suitable material and bent in the middle so as to bring the straight
parts nearly parallel with each other about 6 inches apart from each one
The two ends of each tube must be fixed (water tight) in the boiler one end
of each as near the bottom as possible and the other end at a point immedi
ately on the bottom one. When these tubes are inserted in the boiler the tubes
should be long enough to admit the boiler to stand an inch and a
half or two inches from the Stove the tubes extending through an opening in
the back plate of the Stove into the back flue nearly to the back end of the bottom
flue The opening in the back plate may be seven inches from the bottom
six inches high and wide enough to admit the tubes. It may be square
or oblong as the case may be, and in fixing the tubes to the boiler they
should pass through a plate of sheet iron or other suitable material
large enough to cover the opening in the end plate, and the sides to
turn back and be riveted to the boiler to keep it steady at its proper distance
from the boiler and to steady the tubes. Another [illegible] may be made for this opening when the boiler is removed, and fastened by a hook at one
side and a latch at the other or in any other convenient way. –

The bottom plate of the stove may be widened out at the sides of the stove about 9 inches on each side rounded off in a circular form, or sheet iron shelves may be made and attached to the sides In the former case the rods will pass through these shelves. They are designed to support small boilers or a tea kettle with circulating tubes similar in principle to those of the back boiler – or to set articles on them to be heated or kept warm at the sides of the stove. To admit the tubes of the side boilers &c openings of suitable size may be made in the side plates, and covered with plates suspended by a rivet (hook) at the upper end and immediately above the openings. If coal is used for fuel cases of sheet iron or tin without sol-dering may be made to fit the bottoms of the top boilers &c just so far as exposed to the fire. They should fit the boilers &c closely and be perforated with a number of small holes. They will obstruct the action of the fire in some degree, but will defend the boilers from much of the soot that would collect upon them. In each flue are two dampers made of thin plates of cast or sheet iron long enough to reach across the stove without grinding at the ends and wide enough for the two to close the flue without binding against each other or the other plates. They are fixed on gudgeons near their outer edges passing through the side plates and leaving the ends square to receive spiral handles similar to those described for the doors of the oven. The handles stand level when the dampers are closed and turn out from each other as the dampers are opened until raised to stand up against the sides of the flue. They should be placed so low down in the flue as not to reach the bottoms of the boilers when opened.

In the bottom flue at the front end is an opening through each side plate about three inches long and 1½ wide. They are closed and opened by dampers or stoppers on the outside of the stove, of suitable form suspended on rods which pass through holes of [illegible] size above the [illegible] of the others and [illegible] to the bottom flue of the oven to a short [illegible] long [illegible] to the bottom plate and [illegible] [illegible] rods [illegible] the [illegible]. [illegible] may [illegible] go through the dampers and are adjusted by screws to the right length. Short handles of any [illegible]
form may be affixed to the dampers to draw them backwards and forwards
The whole apparatus of the rods and short plate to which they are attached
must not be so thick as for the turned up edge of the front Sliding plate
to touch them in being pushed back The doors to the fire place may be hinged as common
and one side may latch to the top and the other half down to the [illegible] both
inside, the [illegible] which they turn passing through the doors and receiving handles
as already described. That to fasten to the top may be riveted at one end to an up
-right bolt of convenient length the upper end of which passing thro' a staple
near the upper edge of the door, which will be shot up or down as the handle
is turned.

The bottom of the grate is 20½ inches long and 12 wide, resting by their
edges on the sides of the ash pit and extending forward a quarter of an inch out
side of the door. The bars (for wood) may be about 1½ inch wide at top
slanted off to a point at bottom 3/4 of an inch deep and a quarter of an
inch apart for coal they may be wider. At the back end of the grate is a
plate attached by hooks (in holes drilled into the end of the grate) 12 inches
long and 5 wide to cover the ash pit when the grate is drawn forward.
For coal the grate must have a front and two sides. The sides are six
inches high having 3 bars. The ends on the inner sides have each a groove
to receive a projection on the ends of the front grate. About half the thickness of the upright
bars of the side grates (taken across the direction of the stove) is cut down to the
height of the front grate, which is about 4 inches high (having 2 bars)
And where this cut stops cut a dove tail open [illegible] slanting downwards
and forward on the outer sides to receive a corresponding dove tail with [illegible]
each end of the top bar of the front grate is cut by which the side grates are
held together; the ends of the front grate have small tongues, under the
dove tails to slip down in the grooves in the ends of the side grates.
The whole is attached to the bottom by 2 [illegible] at the bottom of each side
grate slanting inward and passing between the 2 outside bars on each
side of the bottom grate [illegible] to receive them.

The ash pit [illegible]

cast with the bottom plate or made of sheet iron and rivetted to it, in this
case there should be ledges on the sides of the ash pit about 1/4 of an inch thick
& one inch wide slanting downward and inward to which the sheet iron
is to be rivetted. An ash box to fit this pit and close it at its front and under
the hearth is to be made to slide in and out of the ash pit like a drawer. The front
end of it should be so deep as to reach up to the bottom of the bottom plate, the
other part should be so shallow as not to come in contact with the grate.
In the bottom plate behind the ash pit is a second ash pit cast 1½ inch
deep as wide as the ash pit and extending back to within 4 inches of the
back of the Stove. ... .. ......

The openings of the top may be closed when the boilers are
out or for other purposes by covers with edges raised at pleasure and ledges
at bottom adapted to the size of the holes in the top. These may be used
for baking &c. Thin plates may be also used to cover these holes having
holes in them adapted to receive small pots &c. to increase the furniture
of the Stove. Vegetable Steamers may be made of tin fitted to the size of the
boilers and suspended from the top by strips of tin hooked on the edge of
the boiler. The covers for the boilers must be made to allow room for
these strips. .....

A plate of sheet iron about 6 inches wide attached to the front
plate over the door and extending across the Stove with the ends bent
down about one inch. The fire by the use of the dampers may be thrown
to either end of the Stove, and by putting either end of the top plate forward
when the Stove is put up the pipe may be placed near the back or front
end. When it is desired to heat the oven to its hottest state draw both
sliding plates forward and open the dampers of the front flue.
If the heat be wanted particularly in the front end of the oven keep the
same dampers open and push back both plates. To take off a portion
of the heat extend the sliding plates so as to exclude the fire from the
bottom flue, If it is necessary to cool it still more open the side dam-
pers and let in the cold air into the flue. To heat the upper back
boiler particularly open the back damper or dampers and push the
grate back. To make an open fire particularly with coal

6614X upon the fire there and burn the posts and above & under

Witnesses: Witness my hand this 4 March 29 1831

Ezekiel Morris — Elisha Rose

Benjamin Wright — David Updegraff

Ex d

Ackl:

3235 x 83